United States Patent
Shi et al.

(10) Patent No.: US 10,530,016 B2
(45) Date of Patent: Jan. 7, 2020

(54) ELECTROLYTE FOR LITHIUM-ION BATTERY AND LITHIUM-ION BATTERY

(71) Applicant: SHENZHEN CAPCHEM TECHNOLOGY CO., LTD., Shenzhen (CN)

(72) Inventors: Qiao Shi, Shenzhen (CN); Qun Chen, Shenzhen (CN); Shiguang Hu, Shenzhen (CN); Qi Huang, Shenzhen (CN); Xue Zhou, Shenzhen (CN)

(73) Assignee: SHENZHEN CAPCHEM TECHNOLOGY CO., LTD., Shenzhen, Guangdong (CN)

( * ) Notice: Subject to any disclaimer, the term of this patent is extended or adjusted under 35 U.S.C. 154(b) by 165 days.

(21) Appl. No.: 15/557,788

(22) PCT Filed: Dec. 24, 2015

(86) PCT No.: PCT/CN2015/098657
§ 371 (c)(1),
(2) Date: Sep. 12, 2017

(87) PCT Pub. No.: WO2017/101141
PCT Pub. Date: Jun. 22, 2017

(65) Prior Publication Data
US 2018/0076488 A1    Mar. 15, 2018

(30) Foreign Application Priority Data

Dec. 18, 2015    (CN) .......................... 2015 1 0964662

(51) Int. Cl.
*H01M 10/42* (2006.01)
*H01M 10/0525* (2010.01)
*H01M 10/0567* (2010.01)
*H01M 10/0568* (2010.01)
*H01M 4/525* (2010.01)
*H01M 10/0569* (2010.01)

(52) U.S. Cl.
CPC ....... *H01M 10/4235* (2013.01); *H01M 4/525* (2013.01); *H01M 10/0525* (2013.01); *H01M 10/0567* (2013.01); *H01M 10/0568* (2013.01); *H01M 10/0569* (2013.01); *H01M 2300/004* (2013.01); *H01M 2300/0025* (2013.01)

(58) Field of Classification Search
CPC ......... H01M 10/4235; H01M 10/0567; H01M 10/0525; H01M 10/0568; H01M 10/0569; H01M 4/525; H01M 2300/0025; H01M 2300/004
See application file for complete search history.

(56) References Cited

U.S. PATENT DOCUMENTS

| | | |
|---|---|---|
| 6,919,141 B2 | 7/2005 | Gan et al. |
| 2003/0113635 A1 | 6/2003 | Gan et al. |
| 2006/0194118 A1 * | 8/2006 | Yew ...................... H01M 6/168 429/326 |
| 2009/0176164 A1 | 7/2009 | Matsui et al. |
| 2009/0181301 A1 | 7/2009 | Kim et al. |
| 2010/0255369 A1 | 10/2010 | Hwang et al. |
| 2012/0018077 A1 | 1/2012 | Lee et al. |
| 2012/0034533 A1 | 2/2012 | Hong et al. |
| 2012/0100436 A1 | 4/2012 | Inoue et al. |
| 2012/0107700 A1 | 5/2012 | Deguchi |
| 2013/0122378 A1 | 5/2013 | Oh et al. |
| 2013/0183579 A1 | 7/2013 | Kim et al. |
| 2013/0323605 A1 * | 12/2013 | Yamamoto ............ H01M 4/587 429/332 |

FOREIGN PATENT DOCUMENTS

| | | |
|---|---|---|
| CN | 1558464 | 12/2004 |
| CN | 1866605 A | 11/2006 |
| CN | 101385183 A | 3/2009 |
| CN | 101440105 | 5/2009 |
| CN | 101517678 A | 8/2009 |
| CN | 100585935 C | 1/2010 |

(Continued)

OTHER PUBLICATIONS

Machine translation of Chu CN103441304 (Year: 2013).*
U.S. Appl. No. 15/557,780, filed Sep. 12, 2017, Shi et al.
U.S. Appl. No. 15/558,551, filed Sep. 14, 2017, Shi et al.
U.S. Appl. No. 15/559,014, filed Sep. 15, 2017, Shi et al.
International Search Report for PCT/CN2015/091506 dated May 3, 2016, and its English translation provided by WIPO.
Written Opinion of the International Search Authority for PCT/CN2015/091506 dated May 3, 2016, and its English translation provided by Bing.Com Microsoft Translate.
From CN201510481841.3, 1st Office Action dated Jul. 6, 2016 with an English translation from Espacenet Global Dossier.
From CN201510481841.3, Search Report dated Jun. 28, 2016.

(Continued)

*Primary Examiner* — Lisa S Park
(74) *Attorney, Agent, or Firm* — Ladas & Parry, LLP

(57) ABSTRACT

An electrolyte for a lithium-ion battery and a lithium-ion battery. The electrolyte for a lithium-ion battery comprises a non-aqueous organic solvent, a lithium salt, and an electrolyte additive. The additive is selected from compounds of formula 1, wherein R1 is selected from unsaturated alkyls having three to six carbon atoms, and R2 is selected from alkylenes having two to five carbon atoms. Because the molecular structure of the additive comprises both unsaturated carbon-carbon bonds and cyanos, polymerization can occur on an electrode surface to form a compound containing multiple cyanos. The compound can be complexed with metal ions on a surface of a cathode material, thereby inhibiting electrolyte decomposition on an electrode surface to improve high-temperature storage and cyclability of a battery.

formula 1

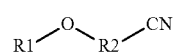

13 Claims, No Drawings

(56) References Cited

FOREIGN PATENT DOCUMENTS

| | | |
|---|---|---|
| CN | 101882696 | 11/2010 |
| CN | 102150315 A | 8/2011 |
| CN | 102450315 | 8/2011 |
| CN | 102280664 | 12/2011 |
| CN | 102332607 A | 1/2012 |
| CN | 102394311 A | 3/2012 |
| CN | 102460817 A | 5/2012 |
| CN | 102473962 A | 5/2012 |
| CN | 102983353 | 3/2013 |
| CN | 103107360 A | 5/2013 |
| CN | 103151559 A | 6/2013 |
| CN | 103151559 A | 6/2013 |
| CN | 103208623 A | 7/2013 |
| CN | 103339783 A | 10/2013 |
| CN | 103441304 A | 12/2013 |
| CN | 103531864 A | 1/2014 |
| CN | 103594729 A | 2/2014 |
| CN | 102439776 B | 4/2014 |
| CN | 103715454 A | 4/2014 |
| CN | 103811815 A | 5/2014 |
| CN | 104300174 A | 1/2015 |
| CN | 104466248 A | 3/2015 |
| CN | 104600361 A | 5/2015 |
| CN | 104752764 A | 7/2015 |
| EP | 1213782 A2 | 6/2002 |
| JP | 2000-348764 | 12/2000 |
| JP | 2004-165151 | 6/2004 |
| JP | 2011-124039 A | 6/2011 |
| JP | 2012-084384 A | 4/2012 |
| JP | 2015060819 A | 3/2015 |
| KR | 20070103919 A | 10/2007 |
| KR | 10-1195931 B1 | 10/2012 |

OTHER PUBLICATIONS

From CN201510964662.5, 1st Office Action dated May 24, 2017 with an English translation from Espacenet Global Dossier.
From CN201510964662.5, Search Report dated May 12, 2017.
From CN201310624603.4, First Office Action dated Mar. 31, 2015 with an English translation from Espacenet Global Dossier.
From CN201310624603.4, Search Report dated Mar. 23, 2015.
From CN201410534841.0, First Office Action dated Feb. 25, 2016 with an English translation from Espacenet Global Dossier.
From CN201410534841.0, Second Office Action dated Sep. 2, 2016 with an English translation from Espacenet Global Dossier.
From CN20141534841.0, Third Office Action dated Mar. 1, 2017 with an English translation from Espacenet Global Dossier.
From CN20141534841.0, Search Report dated Feb. 17, 2016.
International Search Report for PCT/CN2015/098657 dated Mar. 24, 2016, and its English translation provided by WIPO.
Written Opinion of the International Search Authority for PCT/CN2015/098657 dated Mar. 24, 2016, and its English translation provided by Bing.Com Microsoft Translate.
International Search Report for PCT/CN2015/095386 dated Apr. 13, 2016, and its English translation provided by WIPO.
Written Opinion of the International Search Authority for PCT/CN2015/095386 dated Apr. 13, 2016, and its English translation provided by Bing.Com Microsoft Translate.
From CN201510742728.6, $1^{st}$ office action dated Jun. 2, 2017, with an English translation from Espacenet global dossier.
From CN201510742728.6, Search Report dated May 19, 2017.
From CN2013146105.6, First Office Action dated Aug. 25, 2014, with an English translation from Espacenet global dossier.
From CN2013146105.6, Second Office Action dated Feb. 10, 2015, with an English translation from Espacenet global dossier.
From CN2013146105.6, Third Office Action dated Apr. 24, 2015, with an English translation from Espacenet global dossier.
From CN2013146105.6, Supplementary search dated Feb. 2, 2015.
International Search Report for PCT/CN2015/083624 dated Sep. 11, 2015, and its English translation provided by WIPO.
Written Opinion of the International Search Authority for PCT/CN2015/083624 dated Sep. 11, 2015, and its English translation provided by Bing.Com Microsoft Translate.
"Electronegativity-induced enhancement of thermal stability by succinonitrile as an additive for Li ion batteries", Energy & Environmental Science, 2011, 4, 4038-4045.
"Surface Complex Formation between Aliphatic Nitrile Molecules and Transition Metal Atoms for Thermally Stable Lithium-Ion Batteries", Applied Materials & Interfaces, 2014, 6, 8913-8920.

* cited by examiner

ELECTROLYTE FOR LITHIUM-ION BATTERY AND LITHIUM-ION BATTERY

CROSS REFERENCE TO RELATED APPLICATIONS

The present application is the U.S. national phase of PCT Application No. PCT/CN2015/098657 filed on Dec. 24, 2015, which claims priority to Chinese Patent Application No. 201510964662.5 filed on Dec. 18, 2015, the disclosures of which are incorporated herein by reference in their entireties.

TECHNICAL FIELD

The present invention relates to the field of lithium-ion battery technology, and in particular to an electrolyte for a lithium-ion battery and a lithium-ion battery.

BACKGROUND OF THE INVENTION

Compared with other batteries, a lithium-ion battery has the advantages of light mass, small volume, high working voltage, high energy density, high output power, high charging efficiency, no memory effect, long cycle life and the like, and is not only widely used in the fields of mobile phones, notebook computers and other digital products, but also regarded as one of the best choices for electric vehicles and large energy storage devices. At present, digital electronic products, such as smartphones and tablet computers, have increasingly higher requirements for the battery energy density, so that lithium-ion batteries for commercial use can hardly meet the requirements. A most effective way to enhance the energy density of lithium ion batteries is adopting a high capacity positive electrode material or a high voltage positive electrode material.

However, in high-voltage batteries, while the charging voltage of the positive electrode material is increased, the oxygenolysis phenomenon of the electrolyte will be intensified, thereby resulting in the battery performance deterioration. In addition, the high voltage battery has a common phenomenon of the positive electrode metal ion dissolution during use. Especially after prolonged high temperature storage of the battery, the dissolution of the positive electrode metal ion is further intensified, so that the retained capacity of the battery is low. At present, a commercialized high voltage lithium cobaltate battery of more than or equal to 4.3V generally has the problems of poor high temperature cycle performance and poor high temperature storage performance, mainly reflected in thickness swelling and great internal resistance increase after high temperature cycle, and low capacity retention after prolonged high temperature storage. The factors resulting in these problems mainly include: (1) oxygenolysis of the electrolyte. Under a high voltage, the positive electrode active material has a high oxidative activity, thereby increasing the reactivity between the positive electrode active material and the electrolyte. Furthermore, at a high temperature, the reaction between the high voltage positive electrode and the electrolyte is further intensified, so that oxygenolysis products of the electrolyte unceasingly deposit on the surface of the positive electrode, surface characteristics of the positive electrode are degraded, and internal resistance and thickness of the battery are constantly increased; (2) metal ion dissolution and reduction of the positive electrode active substance. On the one hand, at a high temperature, it is extremely easy for $LiPF_6$ in the electrolyte to decompose, thereby generating HF and $PF_5$. HF corrodes the positive electrode and causes the metal ion dissolution, thus damaging the structure of the positive electrode material and resulting in capacity losses. On the other hand, under a high voltage, the electrolyte is easily oxidized at the positive electrode, so that metal ions of the positive electrode active substance are easily reduced and then dissolved in the electrolyte, thereby damaging the structure of the positive electrode material, and resulting in capacity losses. At the same time, metal ions dissolved in the electrolyte easily reach the negative electrode through SEI, and are reduced to metal elementary substances after gaining electrons, thus damaging the SEI structure, constantly increasing the negative electrode impedance, intensifying the battery self-discharge, increasing the irreversible capacity, and resulting in the performance deterioration.

Chinese patent CN100585935C discloses a non-aqueous electrolyte containing a dinitrile compound, which can be used to improve the cycle performance and storage performance of batteries. Kim reported in a document (Energy & Environmental Science, 2011, 4, 4038-4045) that succinonitrile (SN) can have a complex reaction with Co ions on the surface of an $LiCoO_2$ material, thereby effectively inhibiting the decomposition reaction of the electrolyte on its surface, and improving the cycle performance of batteries. Kim reported in a document (Applied Materials & Interfaces, 2014, 6, 8913-8920) that addition of a mononitrile or dinitrile compound in the electrolyte can enhance the thermal stability of LiCoO2 batteries due to interaction between cyano groups and Co ions. The present inventor found that succinonitrile can improve the high temperature storage and cycle performances of batteries under a high voltage, but the performances are still less satisfactory and need to be further improved.

SUMMARY OF THE INVENTION

The present invention provides a non-aqueous electrolyte capable of improving high temperature storage and cycle performances of a lithium-ion battery, and further provides a lithium-ion battery including the non-aqueous electrolyte.

According to a first aspect of the present invention, the present invention provides an electrolyte for a lithium-ion battery, including a non-aqueous organic solvent, a lithium salt and an electrolyte additive. The additive is selected from compounds expressed by a structural formula 1,

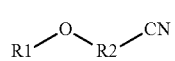

Structural formula 1 wherein R1 is selected from unsaturated alkyls having 3 to 6 carbon atoms, and R2 is selected from alkylenes having 2 to 5 carbon atoms.

As a further improved solution of the present invention, the content of the additive is 0.1 to 3% of the total weight of the electrolyte.

As a still further improved solution of the present invention, the content of the additive is 0.2 to 2% of the total weight of the electrolyte.

As a preferable solution of the present invention, the additive is selected from the following compounds:

As a further improved solution of the present invention, the electrolyte further comprises one or more than two additives selected from vinylene carbonate (VC), vinyl ethylene carbonate (VEC) and fluoroethylene carbonate (FEC).

As a further improved solution of the present invention, the electrolyte further comprises one or two additives selected from 1,3-propanesultone (1,3-PS) and 1, 4-butanesultone (BS).

As a further improved solution of the present invention, the electrolyte further comprises a dinitrile compound NC—R—CN, wherein R is an alkylene group.

As a still further improved solution of the present invention, the dinitrile compound is one or two selected from succinonitrile and adiponitrile.

As a preferable solution of the present invention, the non-aqueous organic solvent is one or more than two selected from ethylene carbonate, propylene carbonate, butylene carbonate, dimethyl carbonate, diethyl carbonate, ethyl methyl carbonate and propyl methyl carbonate, preferably a combination of ethylene carbonate, diethyl carbonate and ethyl methyl carbonate.

As a preferable solution of the present invention, the lithium salt is one or more than two selected from $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

According to a second aspect of the present invention, the present invention provides a lithium-ion battery, comprising a positive electrode, a negative electrode and a diaphragm between the positive electrode and the negative electrode, and further comprising the electrolyte for the lithium-ion battery according to the first aspect.

As a preferable solution of the present invention, the positive electrode active substance is $LiNi_xCo_yMn_zL_{(1-x-y-z)}O_2$, wherein L is Al, Sr, Mg, Ti, Ca, Zr, Zn, Si or Fe, and $0 \leq x \leq 1$, $0 \leq y \leq 1$, $0 \leq z \leq 1$, $0 \leq x+y+z \leq 1$.

As a further preferable solution of the present invention, the positive electrode active substance is $LiCo_xL_{(1-x)}O_2$, wherein L is Al, Sr, Mg, Ti, Ca, Zr, Zn, Si or Fe, and $0 \leq x \leq 1$.

The electrolyte for the lithium-ion battery in the present invention comprises an additive expressed by a structural formula 1, which can significantly improve the high temperature storage and cycle performances of the battery.

DETAILED DESCRIPTION OF THE INVENTION

The present invention will be further described in detail below in conjunction with embodiments.

The key to the electrolyte for the lithium-ion battery in the present invention is that it comprises a compound expressed by the structural formula 1 as an additive Structural formula 1

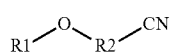

wherein R1 is selected from unsaturated alkyls having 3 to 6 carbon atoms, and R2 is selected from alkylenes having 2 to 5 carbon atoms. The compound expressed by the structural formula 1 can be obtained through the following reaction pathways:

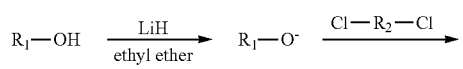

-continued

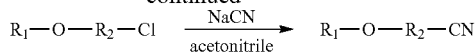

A reaction principle and process conditions involved in the reaction process are known and mature in the art, and those skilled in this art can easily synthesize the compound of the present invention.

R1 is selected from unsaturated alkyls having 3 to 6 carbon atoms, and R2 is selected from alkylenes having 2 to 5 carbon atoms.

The action mechanism of the compound expressed by the structural formula 1 is not very clear, but the inventor inferred that the molecular structure of the compound expressed by the structural formula 1 may contain both unsaturated carbon-carbon bonds and cyano groups, and polymerization reaction can occur on an electrode surface to form a compound containing multiple cyano groups in the initial charging process. The compound can be complexed with metal ions on the surface of a positive electrode material, thereby inhibiting a catalytic decomposition reaction of metal ions on the electrolyte, and further improving the high temperature storage and cycle performances of a battery.

In the compound expressed by the structural formula 1, the number of carbon atoms of the R1 group has an important influence on its performance. The inventor found after in-depth study that R1 selected from unsaturated alkyls having 3 to 6 carbon atoms can significantly achieve the above effect. When R1 is selected from unsaturated alkyls having more than 6 carbon atoms, the impedance of the compound formed on the electrode surface is very high, and the effect of complexing with metal ions is reduced, which reduces the high temperature storage and cycle performances of a battery on the contrary.

The inventor also found that the value of R2 also has an important influence on its performance. R2 selected from alkylenes having 2 to 5 carbon atoms can significantly achieve the above effect. When the number of carbon atoms is more than 5, the impedance of the compound formed on the electrode surface is very high, and the effect of complexing with metal ions is reduced, which reduces the high temperature storage and cycle performances of a battery on the contrary.

In the compound expressed by the structural formula 1, the R1 group is a linear or branched chain unsaturated alkyl, wherein the linear alkyl is an alkenyl, an alkynyl, or the like, and typical but non-limiting alkenyl examples comprise a propenyl, an allyl, a butenyl, a pentenyl, a hexenyl, and the like; typical but non-limiting alkynyl examples comprise a propinyl, a propargyl, a butynyl, a pentynyl, a hexynyl, and the like. The R2 group is an alkylene, may be a linear or branched chain saturated alkylene, and may also be a branched or linear chain unsaturated alkylene. Typical but non-limiting examples of linear chain saturated alkylenes comprise an ethylidene, a propylidene, a butylidene, an amylidene, and the like.

Table 1 shows some examples of compounds expressed by the structural formula 1 in the present invention.

TABLE 1

| Compound | Structural formula |
|---|---|
| Compound 1 | |

TABLE 1-continued

| Compound | Structural formula |
|---|---|
| Compound 2 | HC≡C–CH₂–O–CH₂–CH₂–CN |
| Compound 3 | CH₂=CH–CH₂–O–CH₂–CH₂–CN |
| Compound 4 | HC≡C–CH₂–O–CH₂–CH₂–CH₂–CN |
| Compound 5 | CH₂=CH–CH₂–O–CH₂–CH₂–CN |
| Compound 6 | CH₂=CH–CH₂–O–CH(CH₃)–CH₂–CN |
| Compound 7 | CH₂=CH–CH₂–CH₂–O–CH₂–CH₂–CH₂–CN |
| Compound 8 | HC≡C–CH₂–CH₂–O–CH₂–CH₂–CH₂–CN |

The content of the compound expressed by the structural formula 1 in the electrolyte has a certain influence on its performance. In a preferable embodiment of the present invention, the content of the compound expressed by the structural formula 1 is 0.1% to 3% of the total mass of the electrolyte. When the content is less than 0.1%, complexation with metal ions has poor effect, so that it is difficult to fully improve high-temperature storage performance and cycle performance of a battery; while when the content is more than 3%, the compound expressed by the structural formula 1 forms a very thick passive film on an electrode surface, and the internal resistance of the battery is very high, thereby resulting in the battery performance deterioration. In a still preferable embodiment of the present invention, the content of the compound expressed by the structural formula 1 is 0.2% to 2% of the total mass of the electrolyte.

Other additives may also be added to the electrolyte for the lithium-ion battery of the present invention, such as one or more than two additives selected from vinylene carbonate (VC), vinyl ethylene carbonate (VEC) and fluoroethylene carbonate (FEC); or one or two additives selected from 1,3-propanesultone (1,3-PS) and 1,4-butanesultone (BS). These additives can form a more stable SEI film on the surface of the graphite negative electrode, thereby significantly improving the cycle performance of the lithium-ion battery. These additives may be added as per a general addition amount in the field, such as 0.1% to 5%, preferably 0.2% to 3%, more preferably 0.5% to 2%, of the total mass of the electrolyte.

Researches show that combined use of the compound expressed by the structural formula 1 of the present invention and other additives as above can achieve more excellent effect than when they are separately used, the reason thereof is inferred as that there is a synergistic effect between them, i.e. the compound expressed by the structural formula 1 and other additives jointly improve high temperature storage and cycle performances of the battery by the synergistic effect.

In a preferable embodiment of the present invention, the non-aqueous organic solvent is one or more than two selected from ethylene carbonate, propylene carbonate, butylene carbonate, dimethyl carbonate, diethyl carbonate, ethyl methyl carbonate and propyl methyl carbonate; preferably a combination of ethylene carbonate, diethyl carbonate and ethyl methyl carbonate.

The ethylene carbonate, propylene carbonate and butylene carbonate are cyclic carbonates, and dimethyl carbonate, diethyl carbonate, ethyl methyl carbonate and methyl propyl carbonate are acyclic carbonates. A mixed liquor of a cyclic carbonate organic solvent having a high dielectric constant and an acyclic carbonate organic solvent having a low viscosity is used as a solvent of the lithium-ion battery electrolyte, so that the mixed liquor of the organic solvents has a high ionic conductivity, a high dielectric constant and a low viscosity.

In a preferable embodiment of the present invention, the lithium salt is one or more than two selected from $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$, preferably $LiPF_6$ or a mixture of $LiPF_6$ and other lithium salts.

An embodiment of the present invention provides a lithium-ion battery, comprising a positive electrode, a negative electrode and a diaphragm between the positive electrode and the negative electrode, and further comprising the electrolyte for the lithium-ion battery.

In a preferable embodiment of the present invention, the positive electrode active substance is $LiNi_xCo_yMn_zL_{(1-x-y-z)}O_2$, wherein L is Al, Sr, Mg, Ti, Ca, Zr, Zn, Si or Fe, and $0 \leq x \leq 1$, $0 \leq y \leq 1$, $0 \leq z \leq 1$, $0 \leq x+y+z \leq 1$.

In a further preferable embodiment of the present invention, the positive electrode active substance is $LiCo_xL_{(1-x)}O_2$, wherein L is Al, Sr, Mg, Ti, Ca, Zr, Zn, Si or Fe, and $0 \leq x \leq 1$.

The present invention will be described in detail below in conjunction with examples. It should be understood that these examples are only illustrative, but do not limit the scope of protection of the present invention.

Example 1

The method of preparing a lithium-ion battery in this example comprises a step of preparing a positive electrode, a step of preparing a negative electrode, a step of preparing an electrolyte, a step of preparing a diaphragm, and a step of assembling the battery.

The step of preparing the positive electrode comprises: mixing a positive electrode active material lithium cobaltate, a conductive carbon black and a binder polyvinylidene fluoride at a mass ratio of 95:3:2 to be dispersed in N-methyl-2-pyrrolidone to obtain a positive electrode slurry, uniformly coating the slurry on both sides of an aluminum foil, drying, rolling and drying in vacuum, and then welding an aluminum lead wire using an ultrasonic welder to obtain a positive plate having a thickness of 120-150 μm.

The step of preparing the negative electrode comprises: mixing a graphite, a conductive carbon black, a binder styrene-butadiene rubber and carboxymethyl cellulose at a mass ratio of 94:1:2.5:2.5 to be dispersed in deionized water to obtain a negative electrode slurry, uniformly coating the slurry on both sides of a copper foil, drying, rolling and drying in vacuum, and then welding a nickel lead wire using an ultrasonic welder to obtain a negative plate having a thickness of 120-150 μm.

The step of preparing the electrolyte comprises: mixing ethylene carbonate (EC), diethyl carbonate (DEC) and ethyl methyl carbonate (EMC) at a volume ratio of EC:DEC:EMC=1:1:1, then adding lithium hexafluorophosphate ($LiPF_6$) at a concentration of 1.0 mol/L, and then adding 1% compound 1 of the total weight of the electrolyte (compound 1, compound 2 . . . referred to in the examples refer to compounds with corresponding numbers listed in Table 1, similarly hereinafter).

The step of preparing the diaphragm comprises: using a three-layer diaphragm of polypropylene, polyethylene and polypropylene having a thickness of 20 μm.

The step of assembling the battery comprises: placing the three-layer diaphragm having a thickness of 20 μm between the positive plate and the negative plate, then winding a sandwich structure composed of the positive plate, the negative plate and the diaphragm, then flattening the winding body, then placing the winding body in an aluminum foil bag, and baking the winding body in a vacuum baking oven at 75° C. for 48 h to obtain a cell to be filled with liquid, injecting the prepared electrolyte into the cell, carrying out vacuum encapsulation, and then keeping the cell for 24 h.

Then conventional formation of the initial charging was carried out in the following steps: charging at 0.05 C constant current for 180 min, charging at 0.1 C constant current for 240 min, secondary vacuum sealing, then further charging at 0.2 C constant current to 4.35 V, remaining at room temperature for 24 hr, and then discharging at 0.2 C constant current to 3.0 V.

High temperature cycle performance test and high temperature storage performance test methods are as follows.

1) High-Temperature Cycle Performance Test

The battery was placed in a drying oven at a constant temperature of 45° C., charged at 1 C constant current to 4.35 V, charged under a constant voltage until the current was decreased to 0.1 C, and then discharged at 1 C constant current to 3.0 V, which was repeated. The discharge capacity of the 1st cycle and that of the last cycle were recorded to calculate a capacity retention ratio of high-temperature cycles as per the following formula:

Capacity retention ratio=discharge capacity of the last cycle/discharge capacity of the 1st cycle*100%

2) High-Temperature Storage Performance Test

The formed battery was charged at 1 C constant current under a constant voltage to 4.35 V at room temperature, the initial thickness and the initial discharge capacity of the battery were measured, then the battery was stored at 60° C. for certain days, and finally the final thickness of the battery was measured after the battery was cooled to room temperature to calculate the thickness swelling rate of the battery. Afterwards, the battery was discharged at 1 C to 3 V to measure retained capacity and recovered capacity of the battery according to the calculation formula as follows:

Battery thickness swelling rate (%)=(final thickness−initial thickness)/initial thickness×100%;

Battery capacity retention ratio (%)=retained capacity/initial capacity×100%; and Battery capacity recovery ratio (%)=recovered capacity/initial capacity×100%.

Example 2

As shown in Table 2, except that 1% compound 1 was replaced with 1% compound 2 in the preparation of the electrolyte, other conditions were identical to those in example 1, and the measured high-temperature cycle performance and high-temperature storage performance data were shown in Table 3.

Comparative Example 1

As shown in Table 2, except that 1% compound 1 was replaced with 1% succinonitrile (SN) in the preparation of the electrolyte, other conditions were identical to those in example 1, and the measured high-temperature cycle performance and high-temperature storage performance data were shown in Table 3.

Comparative Example 2

As shown in Table 2, except that 1% compound 1 was not added in the preparation of the electrolyte, other conditions were identical to those in example 1, and the measured high-temperature cycle performance and high-temperature storage performance data were shown in Table 3.

TABLE 2

| Example/comparative example | Compound expressed by the structural formula 1 and content thereof | SN and content thereof |
| --- | --- | --- |
| Example 1 | Compound 1: 1% | — |
| Example 2 | Compound 2: 1% | — |
| Comparative example 1 | — | 1% |
| Comparative example 2 | — | — |

TABLE 3

| Example/comparative example | Capacity retention ratio after 100 cycles at 1 C at 45° C. | Storage at 60° C. for 7 days | | |
| --- | --- | --- | --- | --- |
| | | Capacity retention ratio | Capacity recovery rate | Thickness swelling rate |
| Example 1 | 85% | 85.2% | 93.1% | 13% |
| Example 2 | 82.6% | 81.1% | 88.4% | 15% |
| Comparative example 1 | 70.5% | 75.2% | 80.1% | 18.6% |
| Comparative example 2 | 65.2% | 70% | 75% | 25% |

As can be seen from the data in Table 3, succinonitrile can improve the high temperature storage and cycle performances of high voltage batteries. This is mainly because succinonitrile can be complexed with metal ions on the surface of the positive electrode material, thereby inhibiting catalytic oxygenolysis of metal ions on the electrolyte. But because succinonitrile fails to effectively inhibit the electrolyte decomposition on the surface of the positive electrode material, high temperature storage and cycle performances of the battery still remain to be further improved. Compound 1 and compound 2 as shown in Table 1 were added respectively in the electrolyte. The compound 1 and compound 2 can have polymerization reaction on the electrode surface so as to effectively inhibit the electrolyte decomposition reaction on the electrode surface, and can also be complexed with metal ions on the surface of the positive electrode material. Moreover, the effect of complexation with metal ions is better than the effect of succinonitrile, so it is possible to more significantly improve the high temperature storage and cycle performances of high voltage batteries.

Example 3

As shown in Table 4, except that 1% compound 1 was replaced with 0.1% compound 1 in the preparation of the electrolyte, other conditions were identical to those in example 1, and the measured high-temperature cycle performance and high-temperature storage performance data were shown in Table 5.

Example 4

As shown in Table 4, except that 1% compound 1 was replaced with 2% compound 1 in the preparation of the electrolyte, other conditions were identical to those in example 1, and the measured high-temperature cycle performance and high-temperature storage performance data were shown in Table 5.

Example 5

As shown in Table 4, except that 1% compound 1 was replaced with 3% compound 1 in the preparation of the electrolyte, other conditions were identical to those in example 1, and the measured high-temperature cycle performance and high-temperature storage performance data were shown in Table 5.

Comparative Example 3

As shown in Table 4, except that 1% compound 1 was replaced with 0.05% compound 1 in the preparation of the electrolyte, other conditions were identical to those in example 1, and the measured high-temperature cycle performance and high-temperature storage performance data were shown in Table 5.

Comparative Example 4

As shown in Table 4, except that 1% compound 1 was replaced with 4% compound 1 in the preparation of the electrolyte, other conditions were identical to those in example 1, and the measured high-temperature cycle performance and high-temperature storage performance data were shown in Table 5.

TABLE 4

| Example/comparative example | Compound expressed by the structural formula 1 and content thereof |
|---|---|
| Example 3 | Compound 1: 0.1% |
| Example 4 | Compound 1: 2% |
| Example 5 | Compound 1: 3% |
| Comparative example 3 | Compound 1: 0.05% |
| Comparative example 4 | Compound 1: 4% |

TABLE 5

| Example/comparative example | Capacity retention ratio after 100 cycles at 1 C at 45° C. | Storage at 60° C. for 7 days | | |
|---|---|---|---|---|
| | | Capacity retention ratio | Capacity recovery rate | Thickness swelling rate |
| Example 3 | 68.2% | 72.5% | 78.5% | 23.1% |
| Example 4 | 86.4% | 87.1% | 94.4% | 11.5% |
| Example 5 | 85.4% | 86.1% | 93.5% | 9.5% |
| Comparative example 3 | 65.8% | 71.2% | 76.6% | 24.1% |
| Comparative example 4 | 60.1% | 65.5% | 70.1% | 6.2% |

As can be seen from the data in Table 5, when the addition amount of the compound 1 is less than 0.1%, high-temperature storage performance and cycle performance of a high voltage battery cannot be efficiently improved because of failure to be fully complexed with metal ions on the surface of the positive electrode material. When the addition amount of the compound 1 is more than 3%, too many reactants are formed on an electrode surface, which increases the internal resistance of the battery, and results in the high-temperature storage performance and cycle performance deterioration of the battery on the contrary.

Example 6

As shown in Table 6, except that 1% succinonitrile (SN) was additionally added in the preparation of the electrolyte, other conditions were identical to those in example 1, and the measured high-temperature cycle performance and high-temperature storage performance data were shown in Table 7.

Example 7

As shown in Table 6, except that 1% adiponitrile (ADN) was additionally added in the preparation of the electrolyte, other conditions were identical to those in example 1, and the measured high-temperature cycle performance and high-temperature storage performance data were shown in Table 7.

Example 8

As shown in Table 6, except that 1% succinonitrile (SN) and 1% adiponitrile (AND) were additionally added in the preparation of the electrolyte, other conditions were identical to those in example 1, and the measured high-temperature cycle performance and high-temperature storage performance data are shown in Table 7.

Comparative Example 5

As shown in Table 6, except that 1% compound 1 was replaced with 1% adiponitrile (ADN) in the preparation of the electrolyte, other conditions were identical to those in example 1, and the measured high-temperature cycle performance and high-temperature storage performance data were shown in Table 7.

Comparative Example 6

As shown in Table 6, except that 1% compound 1 was replaced with 1% succinonitrile (SN) and 1% adiponitrile (AND) in the preparation of the electrolyte, other conditions were identical to those in example 1, and the measured high-temperature cycle performance and high-temperature storage performance data were shown in Table 7.

TABLE 6

| Example/comparative example | Compound expressed by the structural formula 1 and content thereof | SN and content thereof | ADN and content thereof |
| --- | --- | --- | --- |
| Example 6 | Compound 1: 1% | 1% | — |
| Example 7 | Compound 1: 1% | — | 1% |
| Example 8 | Compound 1: 1% | 1% | 1% |
| Comparative example 1 | — | 1% | — |
| Comparative example 5 | — | — | 1% |
| Comparative example 6 | — | 1% | 1% |

TABLE 7

| | Capacity retention ratio after 100 cycles at 1 C at 45° C. | Storage at 60° C. for 7 days | | |
| --- | --- | --- | --- | --- |
| Example/comparative example | | Capacity retention ratio | Capacity recovery rate | Thickness swelling rate |
| Example 6 | 87% | 87.5% | 94.8% | 11.3% |
| Example 7 | 87.8% | 87.5% | 93.8% | 13.3% |
| Example 8 | 90% | 89.6% | 95.4% | 9.5% |
| Comparative example 1 | 70.5% | 75.2% | 80.1% | 18.6% |
| Comparative example 5 | 69.5% | 75.6% | 80.9% | 19.2% |
| Comparative example 6 | 73.5% | 77.8% | 83.5% | 16.6% |

As can be seen from the data in Table 7, addition of compound 1 on the basis of SN or AND can further improve the high-temperature storage and cycle performances of the battery.

Example 9

As shown in Table 8, except that 1% fluoroethylene carbonate (FEC) was additionally added in the preparation of the electrolyte, other conditions were identical to those in example 1, and the measured high-temperature cycle performance and high-temperature storage performance data were shown in Table 9.

Example 10

As shown in Table 8, except that 1% vinyl ethylene carbonate (VEC) was additionally added in the preparation of the electrolyte, other conditions were identical to those in example 1, and the measured high-temperature cycle performance and high-temperature storage performance data were shown in Table 9.

Example 11

As shown in Table 8, except that 1% vinylene carbonate (VC) was additionally added in the preparation of the electrolyte, other conditions were identical to those in example 1, and the measured high-temperature cycle performance and high-temperature storage performance data were shown in Table 9.

Comparative Example 7

As shown in Table 8, except that 1% compound 1 was replaced with 1% fluoroethylene carbonate (FEC) in the preparation of the electrolyte, other conditions were identical to those in example 1, and the measured high-temperature cycle performance and high-temperature storage performance data were shown in Table 9.

Comparative Example 8

As shown in Table 8, except that 1% compound 1 was replaced with 1% vinyl ethylene carbonate (VEC) in the preparation of the electrolyte, other conditions were identical to those in example 1, and the measured high-temperature cycle performance and high-temperature storage performance data were shown in Table 9.

Comparative Example 9

As shown in Table 8, except that 1% compound 1 was replaced with 1% vinylene carbonate (VC) in the preparation of the electrolyte, other conditions were identical to those in example 1, and the measured high-temperature cycle performance and high-temperature storage performance data were shown in Table 9.

TABLE 8

| Example/comparative example | Compound expressed by the structural formula 1 and content thereof | FEC and content thereof | VEC and content thereof | VC and content thereof |
| --- | --- | --- | --- | --- |
| Example 9 | Compound 1: 1% | 1% | — | — |
| Example 10 | Compound 1: 1% | — | 1% | — |
| Example 11 | Compound 1: 1% | — | — | 1% |
| Comparative example 7 | — | 1% | — | — |
| Comparative example 8 | — | — | 1% | — |
| Comparative example 9 | — | — | — | 1% |

TABLE 9

| | Capacity retention ratio after 300 cycles at 1 C at 45° C. | Storage at 60° C. for 30 days | | |
| --- | --- | --- | --- | --- |
| Example/comparative example | | Capacity retention ratio | Capacity recovery rate | Thickness swelling rate |
| Example 9 | 85.1% | 80.8% | 88.5% | 24.1% |
| Example 10 | 84.5% | 79.8% | 86.8% | 21.5% |
| Example 11 | 86.7% | 78.1% | 83.5% | 26.5% |
| Comparative example 7 | 76.2% | 72.1% | 79.8% | 35% |
| Comparative example 8 | 74.1% | 70.5% | 78.2% | 30.1% |
| Comparative example 9 | 72.5% | 71.5% | 78.8% | 32.1% |

As can be seen from the data in Table 9, addition of compound 1 on the basis of FEC, VEC or VC can significantly improve the high-temperature storage and cycle performances of the battery, because FEC, VEC and VC can form a passive film on the surface of the negative electrode material, thereby inhibiting the electrolyte decomposition on the surface of the negative electrode material. Moreover, the compound 1 can be complexed with metal ions on the surface of the positive electrode material, and inhibit catalytic oxygenolysis of the electrolyte by metal ions, thereby further improving the high temperature storage and cycle performances of the battery.

Example 12

As shown in Table 10, except that 1% fluoroethylene carbonate (FEC) and 1% 1,3-propanesultone (1,3-PS) were additionally added in the preparation of the electrolyte, other conditions were identical to those in example 1, and the measured high-temperature cycle performance and high-temperature storage performance data were shown in Table 11.

Example 13

As shown in Table 10, except that 1% fluoroethylene carbonate (FEC) and 1% 1,4-butanesultone (BS) were additionally added in the preparation of the electrolyte, other conditions were identical to those in example 1, and the measured high-temperature cycle performance and high-temperature storage performance data were shown in Table 11.

Comparative Example 10

As shown in Table 10, except that 1% compound 1 was replaced with 1% fluoroethylene carbonate (FEC) and 1% 1,3-propanesultone (1,3-PS) in the preparation of the electrolyte, other conditions were identical to those in example 1, and the measured high-temperature cycle performance and high-temperature storage performance data were shown in Table 11.

Comparative Example 11

As shown in Table 10, except that 1% compound 1 was replaced with 1% fluoroethylene carbonate (FEC) and 1% 1,4-butanesultone (BS) in the preparation of the electrolyte, other conditions were identical to those in example 1, and the measured high-temperature cycle performance and high-temperature storage performance data were shown in Table 11.

TABLE 10

| Example/ comparative example | Compound expressed by the structural formula 1 and content thereof | FEC and content thereof | 1,3-PS and content thereof | BS and content thereof |
|---|---|---|---|---|
| Example 12 | Compound 1: 1% | 1% | 1% | — |
| Example 13 | Compound 1: 1% | 1% | — | 1% |
| Comparative example 10 | — | 1% | 1% | — |
| Comparative example 11 | — | 1% | — | 1% |

TABLE 11

| Example/ comparative example | Capacity retention ratio after 500 cycles at 1 C at 45° C. | Storage at 60° C. for 30 days | | |
|---|---|---|---|---|
| | | Capacity retention ratio | Capacity recovery rate | Thickness swelling rate |
| Example 12 | 85% | 84.1% | 92.4% | 12.5% |
| Example 13 | 86.5% | 86.2% | 94.8% | 10.5% |
| Comparative example 10 | 80.5% | 76.8% | 82.8% | 18.7% |
| Comparative example 11 | 82.8% | 78.1% | 83.5% | 16.4% |

As can be seen from the data in Table 11, addition of 1% compound 1 on the basis of FEC and 1,3-PS or BS can further improve the high-temperature storage and cycle performances of the battery.

Example 14

As shown in Table 12, except that 1% succinonitrile (SN) was additionally added in the preparation of the electrolyte, other conditions were identical to those in example 12, and the measured high-temperature cycle performance and high-temperature storage performance data were shown in Table 13.

Example 15

As shown in Table 12, except that 1% adiponitrile (ADN) was additionally added in the preparation of the electrolyte, other conditions were identical to those in example 12, and the measured high-temperature cycle performance and high-temperature storage performance data were shown in Table 13.

Example 16

As shown in Table 12, except that 1% succinonitrile (SN) and 1% adiponitrile (AND) were additionally added in the preparation of the electrolyte, other conditions were identical to those in example 12, and the measured high-temperature cycle performance and high-temperature storage performance data were shown in Table 13.

Comparative Example 12

As shown in Table 12, except that 1% succinonitrile (SN) was additionally added in the preparation of the electrolyte, other conditions were identical to those in example 10, and the measured high-temperature cycle performance and high-temperature storage performance data were shown in Table 13.

Comparative Example 13

As shown in Table 12, except that 1% adiponitrile (ADN) was additionally added in the preparation of the electrolyte, other conditions were identical to those in example 10, and the measured high-temperature cycle performance and high-temperature storage performance data were shown in Table 13.

Comparative Example 14

As shown in Table 12, except that 1% succinonitrile (SN) and 1% adiponitrile (AND) were additionally added in the preparation of the electrolyte, other conditions were identical to those in example 10, and the measured high-temperature cycle performance and high-temperature storage performance data were shown in Table 13.

TABLE 12

| Example/ comparative example | Compound expressed by the structural formula 1 and content thereof | FEC and content thereof | 1,3-PS and content thereof | SN and content thereof | ADN and content thereof |
|---|---|---|---|---|---|
| Example 14 | Compound 1: 1% | 1% | 1% | 1% | — |
| Example 15 | Compound 1: 1% | 1% | 1% | — | 1% |

TABLE 12-continued

| Example/ comparative example | Compound expressed by the structural formula 1 and content thereof | FEC and content thereof | 1,3-PS and content thereof | SN and content thereof | ADN and content thereof |
|---|---|---|---|---|---|
| Example 16 | Compound 1: 1% | 1% | 1% | 1% | 1% |
| Comparative example 12 | — | 1% | 1% | 1% | — |
| Comparative example 13 | — | 1% | 1% | — | 1% |
| Comparative example 14 | — | 1% | 1% | 1% | 1% |

TABLE 13

| Example/ comparative example | Capacity retention ratio after 500 cycles at 1 C at 45° C. | Storage at 60° C. for 30 days | | |
|---|---|---|---|---|
| | | Capacity retention ratio | Capacity recovery rate | Thickness swelling rate |
| Example 14 | 86.5% | 83.8% | 88.8% | 12.7% |
| Example 15 | 85.5% | 82.8% | 87.2% | 13.5% |
| Example 16 | 88.5% | 86.8% | 93.8% | 9.7% |
| Comparative example 12 | 83.5% | 78.8% | 85.8% | 15.7% |
| Comparative example 13 | 82.5% | 78.1% | 84.8% | 16.7% |
| Comparative example 14 | 84.5% | 80.8% | 86.8% | 13.7% |

As can be seen from the data in Table 13, addition of 1% compound 1 on the basis of FEC, 1,3-PS and SN or ADN can further improve the high-temperature storage and cycle performances of the high voltage battery.

While the present invention has been further described in detail in conjunction with the specific embodiments set forth above, it shall not be considered that the specific embodiments of the present invention are only limited to these descriptions. For ordinary persons skilled in the art, several simple alternatives or substitutions may also be made without departing from the concept of the present invention, and shall be regarded as falling within the scope of protection of the present invention.

What is claimed is:

1. An electrolyte for a lithium-ion battery, comprising a non-aqueous organic solvent, a lithium salt and an electrolyte additive, wherein the additive is selected from compounds expressed by a structural formula 1,

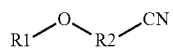

formula 1 wherein, R1 is selected from unsaturated alkyls having 3 to 6 carbon atoms, and R2 is selected from alkylenes having 2 to 5 carbon atoms, and wherein the content of the additive is 0.1 to 3% of the total weight of the electrolyte.

2. The electrolyte according to claim 1, wherein the additive is selected from the following compounds:

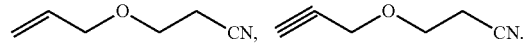

3. The electrolyte according to claim 1, further comprising one or more than two additives selected from vinylene carbonate, vinyl ethylene carbonate and fluoroethylene carbonate.

4. The electrolyte according to claim 1, further comprising one or two additives selected from 1, 3-propanesultone and 1, 4-butanesultone.

5. The electrolyte according to claim 1, further comprising a dinitrile compound NC—R—CN, wherein R is an alkylene group.

6. The electrolyte according to claim 1, wherein the non-aqueous organic solvent is one or more than two selected from ethylene carbonate, propylene carbonate, butylene carbonate, dimethyl carbonate, diethyl carbonate, ethyl methyl carbonate and propyl methyl carbonate.

7. The electrolyte according to claim 1, wherein the lithium salt is one or more than two selected from $LiPF_6$, $LiBF_4$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$.

8. A lithium-ion battery, comprising a positive electrode, a negative electrode and a diaphragm between the positive electrode and the negative electrode, and further comprising the electrolyte for a lithium-ion battery according to claim 1.

9. The lithium-ion battery according to claim 8, wherein the positive electrode active substance is $LiNi_xCo_yMn_zL_{(1-x-y-z)}O_2$, in which L is Al, Sr, Mg, Ti, Ca, Zr, Zn, Si or Fe, and $0 \leq x \leq 1$, $0 \leq y \leq 1$, $0 \leq z \leq 1$, $0 \leq x+y+z \leq 1$.

10. The electrolyte according to claim 1, wherein the content of the additive is 0.2 to 2%, of the total weight of the electrolyte.

11. The electrolyte according to claim 5, wherein the dinitrile compound is one or two selected from succinonitrile and adiponitrile.

12. The electrolyte according to claim 6, wherein the non-aqueous organic solvent is a combination of ethylene carbonate, diethyl carbonate and ethyl methyl carbonate.

13. The lithium-ion battery according to claim 9, wherein the positive electrode active substance is $LiCo_xL_{(1-x)}O_2$, in which L is Al, Sr, Mg, Ti, Ca, Zr, Zn, Si or Fe, and $0 \leq x \leq 1$.

* * * * *